United States Patent [19]
Lefebvre et al.

[11] Patent Number: 5,777,240
[45] Date of Patent: Jul. 7, 1998

[54] LOAD CELL AND LOAD CELL BEAM ASSEMBLY

[75] Inventors: Garett E. Lefebvre, Raymond; Lee E. Nelson, Gray, both of Me.

[73] Assignee: The Montalvo Corporation, Portland, Mass.

[21] Appl. No.: 519,489

[22] Filed: Aug. 25, 1995

(Under 37 CFR 1.47)

[51] Int. Cl.$^6$ ................................................ G01L 1/00
[52] U.S. Cl. ........................... 73/862.634; 73/862.639; 177/229
[58] Field of Search ............... 73/862.041, 862.042, 73/862.044, 862.55, 862.621, 862.627, 862.631, 862.632, 862.633, 862.634, 862.637, 862.638, 862.639, 862.61, 862.382; 177/211, 229, DIG. 9

[56] References Cited

U.S. PATENT DOCUMENTS

| | | | |
|---|---|---|---|
| 3,554,026 | 1/1971 | Seed | 177/211 |
| 3,805,604 | 4/1974 | Ormond | 177/211 |
| 4,107,985 | 8/1978 | Sommer | 177/211 |
| 4,326,424 | 4/1982 | Koenig | 73/862.634 |
| 4,657,097 | 4/1987 | Griffen | 177/211 |
| 5,186,061 | 2/1993 | Montalvo, III et al. | 73/862.632 |
| 5,222,398 | 6/1993 | O'Brien | 177/211 |

*Primary Examiner*—Ronald L. Biegel
*Attorney, Agent, or Firm*—Brooks Haidt Haffner & Delahunty

[57] ABSTRACT

A load cell is disclosed having a top plate and a base plate, the top plate adapted for receiving a pillow block mounting and shaft bearing thereon and the base plate adapted to be fixedly secured to a machine frame or other fixed structure. A deformable spring member is secured to both plates, which upon deforming tilts the top plate. A pair of gauged beams are disposed substantially parallel to the longitudinal axes of the plates and substantially orthogonal to the direction of an applied force. The gauged beams are secured at one end to a support member and at the other to a collar member. A load transfer rod secured at one end to the support member extends through the collar member to a link member secured to the top plate. Upon tilting of the top plate, the load transfer rod and the gauged beams deflect, causing strain gauges on the gauged beams to generate electrical voltage signals proportional to the applied force. Excessive loads and axial loads are diverted away from the gauged beams and the strain gauges.

25 Claims, 5 Drawing Sheets

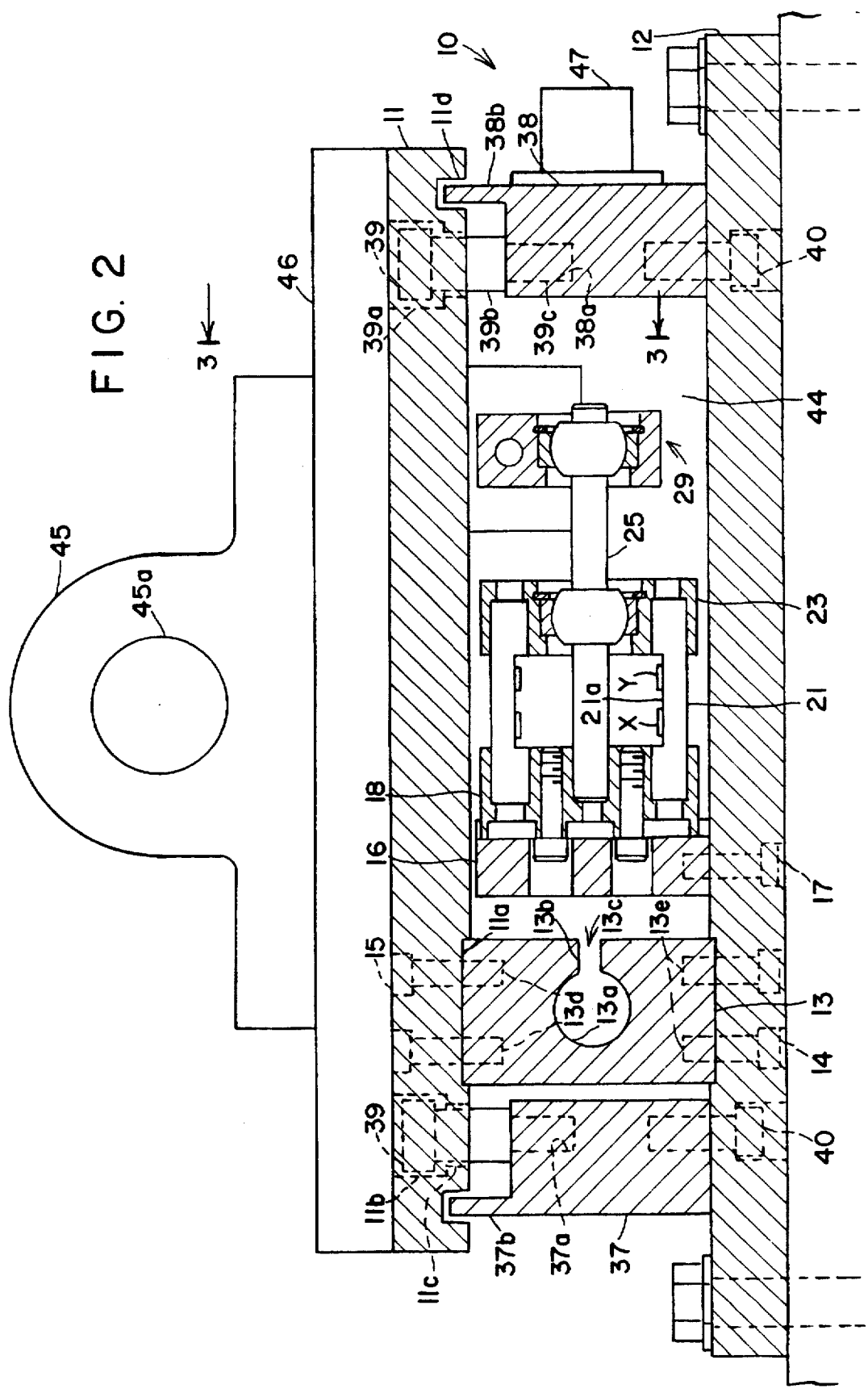

LOAD CELL AND LOAD CELL BEAM ASSEMBLY

BACKGROUND OF THE INVENTION

1. Field of the Invention

The invention relates to the measurement of forces acting on a shaft by means of a load cell.

2. Discussion of the Prior Art

Various arrangements using transducers to convert sensed mechanical forces into electrical signals have been used to measure forces acting on shafts. One important application of such transducer arrangements is the monitoring of tension in a web passing over a roll by measuring the force imposed on the roll by the moving web. Strain gauges have been positioned within roll ends and in roll shaft supporting joints beyond the ends of rolls for sensing the force exerted on a roll by a web moving over and carried by the roll. Signals from such strain gauges can be monitored and web tension can be adjusted accordingly.

U.S. Pat. No. 3,260,106 shows strain gauges mounted on a deflectable member within a cap at the end of a roll shaft. Electrical signals from the strain gauges are transmitted to an electrical bridge circuit such as a Wheatstone bridge circuit. Other strain gauge arrangements are shown in U.S. Pat. Nos. 3,031,152; 3,763,701; 4,052,891; 4,130,014; 4,326,424; 4,674,341 and 4,691,579. The Montalvo Corporation's U.S. Pat. Nos. 5,159,841 and 5,186,061 show still other kinds of strain gauge arrangements for monitoring web tension.

The transducer or load cell beam assembly in U.S. Pat. No. 5,186,061, for example, has a configuration where the strain gauges are mounted on the neutral axis of a load beam. This configuration, however, does not isolate the forces acting on the load beam to those caused by the load, leaving the strain gauges disposed on the load beam susceptible to additional and extraneous forces, such as cell loading due to web shifts and thermal expansion of the shafts or rollers supporting the web. The resultant force acting on the load beam, i.e., the vector summation of the substantially orthogonally-directed load and the axial loading force, causes the beam to deflect in a twist about the neutral axis. This twisting deflection and bending of the beam is detected by the strain gauges, distorting the load measurement.

SUMMARY OF THE INVENTION

The load cell of the invention can be used in conjunction with a pillow block mounting for a roll shaft, such as the shaft of an idler roll. The load cell is disposed between a shaft bearing and a machine frame or other fixed structure, but is shielded from any crushing loads from the shaft and isolated from extraneous axial load forces.

The load cell includes a top plate, upon which the pillow block mounting and shaft bearing are placed, and a bottom, or base plate adapted to be fixedly secured to the machine frame or other fixed structure. A deformable spring member is secured to said top plate at one end thereof and to said base plate. A pair of gauged beams are disposed substantially parallel to said plates and substantially orthogonal to the direction of applied force, the gauged beams being secured at one end to a support member, which is affixed to said base plate, and at the other end to a collar member. A load transfer rod is secured at one end to the support member and extends between and parallel to the gauged beams through the collar member to a link member, which is affixed to the top plate. When loads, such as a web on the shaft, are placed on the load cell, the spring member deforms and the top plate deflects or tilts, deflecting the other end of the load transfer rod and the gauged beams.

Strain gauges, which can be conventional solid state devices, are associated with gauged areas of the beams. The strain gauges are mounted on one or more of the beams to sense strain in the gauged areas of the beams.

The strain gauges are electrically connected to electrical monitoring circuitry, which includes bridge circuitry, and which can include meter and/or alarm means located remotely from the load cell.

Load forces above a predetermined upper limit acting on the load cell are prevented from further bending the load transfer rod and the gauged beams by end members secured to the base plate at two ends of the top plate. By controlling the angle of tilt of the top plate, load forces in excess of the predetermined upper limit are diverted from the less robust internal components of the load cell, thereby preventing component failures and improving operational reliability and efficiency. Further, extraneous forces acting on the shaft bearing, such as from side or axial loading, are isolated from the gauged beams by the link member, which absorbs such axial forces and diverts them away from the load transfer bar and the gauged beams. Operation of the shaft or other associated equipment can be adjusted accordingly, for example, to adjust or stabilize tension in a web carried by a roll associated with the shaft.

The load cell of the invention is also simpler than many prior art mechanisms, and can readily be used in conjunction with existing machinery. Further, the load cell of the invention provides easier access to the internal components thereof, simplifying replacement of any failed component therein without the need for disassembly. These and other advantages of the load cell and load cell beam assembly of the invention will be more fully understood when the following detailed description of preferred embodiments is read in conjunction with the accompanying FIGURES of the drawings.

BRIEF DESCRIPTION OF THE DRAWINGS

In the drawings, in which like reference characters designate like parts throughout:

FIG. 2 is a side view, in cross section, of the load cell and load cell beam assembly shown in FIG. 1;

DETAILED DESCRIPTION OF PREFERRED EMBODIMENTS

Figure 1:
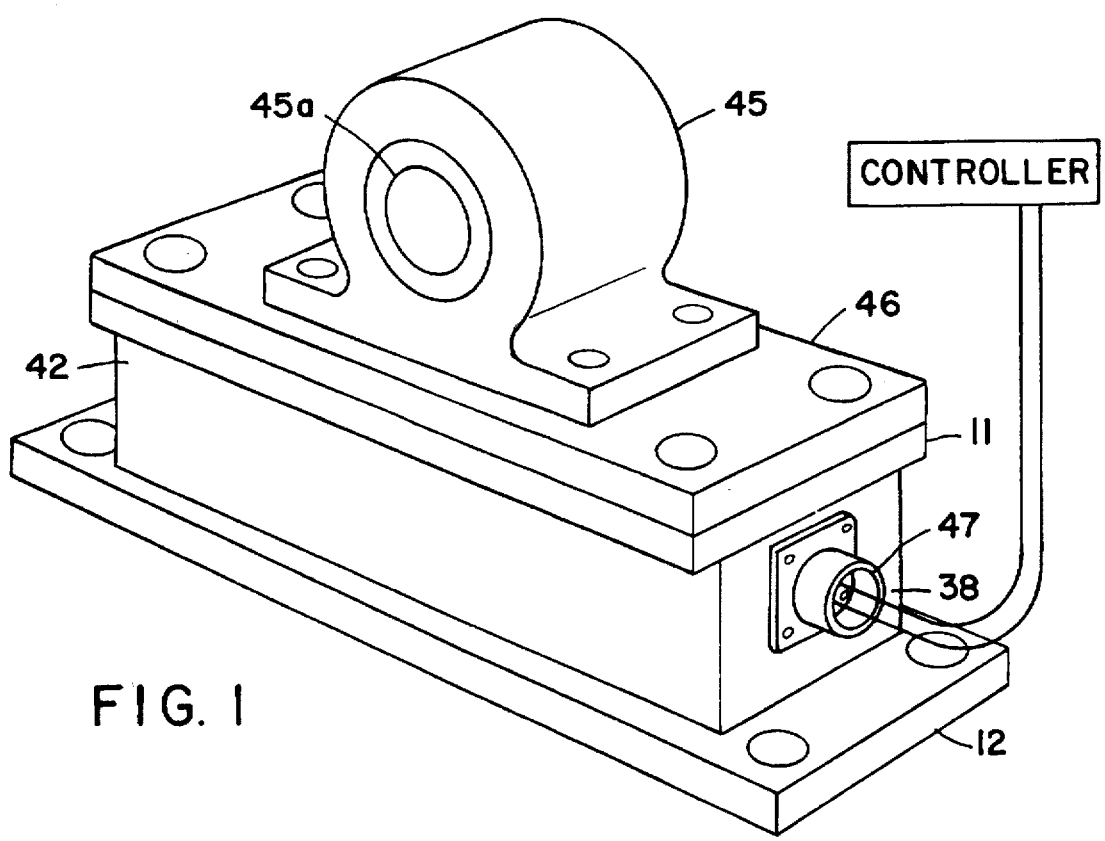
FIG. 1 is a perspective view of a load cell and load cell beam assembly in accordance with the invention.

As shown in FIGS. 1–4, the load cell generally designated by the reference numeral 10 is secured to and between a pillow block plate 46, upon which a bearing is mounted, and a machine frame or other fixed structure, the combination of which constitutes a load cell beam assembly.

The load cell 10 of the invention includes a top plate 11 and a bottom plate, or base plate 12, and a deformable spring member 13, secured to the top plate 11 and base plate 12. Spring member 13 has a deformation means along one side thereof, said deformation means preferably constituting a bore 13a through said spring member 13 and a slot 13b along said one side and substantially parallel to said bore 13a. Both said bore 13a and slot 13b are directed orthogonally to the plane of the illustration of FIG. 2. Slot 13b connects to the bore 13a, forming a narrow gap 13c between an upper 13d and a lower 13e portions of the spring member 13, and allowing the spring member 13 to deform along said gap 13c to close said gap 13c when sufficient force is applied to the upper portion 13d from the top plate 11. As shown in more detail in FIG. 4, spring member 13 is secured within a recessed area or channel 12a within the base plate 12 by a plurality of screw fasteners 14. Similarly, spring member 13 is also secured within a channel 11a, shown in FIG. 2, within the top plate 11 by a plurality of screw fasteners 15. By placing the spring member 13 within the channels 11a and 12a of the top 11 and base 12 plates, respectively, both plates are easily aligned and oriented parallel to one another during assembly and skew is prevented. The surface of the spring member 13 is preferably treated by a shot peen process to relieve any inherent tension within the material which could later cause the deformable spring member 13 to crack due to fatigue. It is to be understood, however, that under no load conditions, i.e., during initialization of the load cell 10 to account for the tare weight of the components without a web, the spring member 13 need not and preferably does not deform. Spring member 13 does, however, deflect in response to a load placed thereon, particularly a web on the shaft.

The load cell 10 of the invention also includes a first guide support 16 adjacent but spaced apart from the spring member 13 and secured to the base plate 12 by a plurality of screw fasteners 17. Adjacent the first guide support 16 is a second guide support 18. As shown in more detail in FIG. 5, the first guide support 16 has a grooved portion 16a for receiving a corresponding tongue portion 18a of the second guide support 18. Supports 16 and 18 are secured together by a plurality of screw fasteners 19 extending through slots 16b in said first guide support 16 into threaded holes 18b in said second guide support 18. Split lock washers 20 around the shafts of the fasteners 19 help hold the guide supports together.

Figure 5:
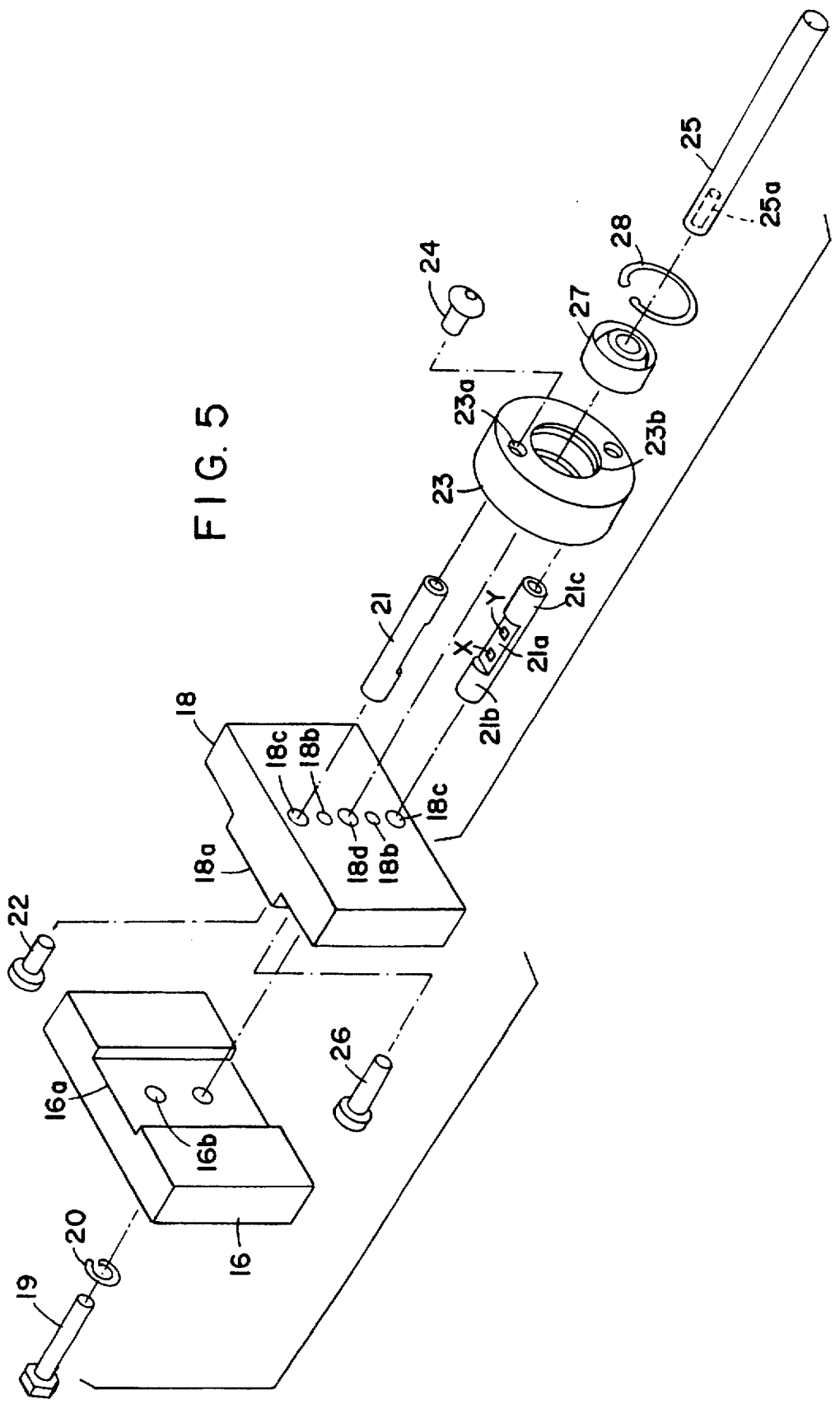
FIG. 5 is an exploded view, in perspective, of a portion of the load cell shown in FIGS. 2 and 4.

A pair of cylindrical gauged beams 21, as shown in more detail in FIG. 5, each have a substantially flat and centrally located gauged portion 21a between a first 21b and a second 21c ungauged end portions of the beams 21. The first end portion 21b of the beams 21 is disposed within a hole 18c in said second guide support 18 and is secured therein by screw fasteners 22. The other or second end portion 21c of the beams 21 is disposed within a hole 23a in a collar member 23 and is secured therein by screw fasteners 24 from the opposite side of the collar member 23, as illustrated in FIG. 5. In this manner, the gauged beams 21 are securely affixed and oriented in a direction substantially parallel to the longitudinal axes of the plates 11 and 12 and substantially orthogonal to the direction of the applied load. As shown in FIGS. 2 and 5, strain gauges x and y are disposed on the gauged portions 21a of the gauged beams 21 to sense strain in the beams 21 and output an electrical voltage signal corresponding to the amount of strain sensed.

A load transfer rod 25 has a threaded hole 25a at one end, said one end being disposed within a central hole 18d in the second guide support 18 and being secured therein by a screw fastener 26. The load transfer rod 25, being substantially parallel to and longer than the gauged beams 21, extends through a central hole 23b in said collar member 23. As illustrated in FIG. 5, the rod 25 also extends through a spherical bearing 27 and a ring 28, both disposed within said central hole 23b of said collar member 23. The spherical bearing 27 allows the load transfer rod 25 to deflect naturally, as a cantilevered beam would, and not bind the load cell 10 by pulling (in tension) one of the gauged beams 21 out of the collar member 23 and pushing (in compression) the other gauged beam 21 into the collar member 23. If the load cell 10 were so bound, this would distort the output of the strain gauges x and y as heretofore described. As shown in FIG. 2, the load transfer rod 25 extends beyond the collar member 23 to a link member 29. Additionally, as shown in FIGS. 2 and 5, the gauged portions 21a of said two or more gauged beams 21 face one another and said load transfer rod 25 therebetween, and preferably two of said gauged beams 21 separated by 180 degrees with respect to said rod 25 are used, more preferably the two beams are oriented vertically above and below the load transfer rod 25.

Figure 3:
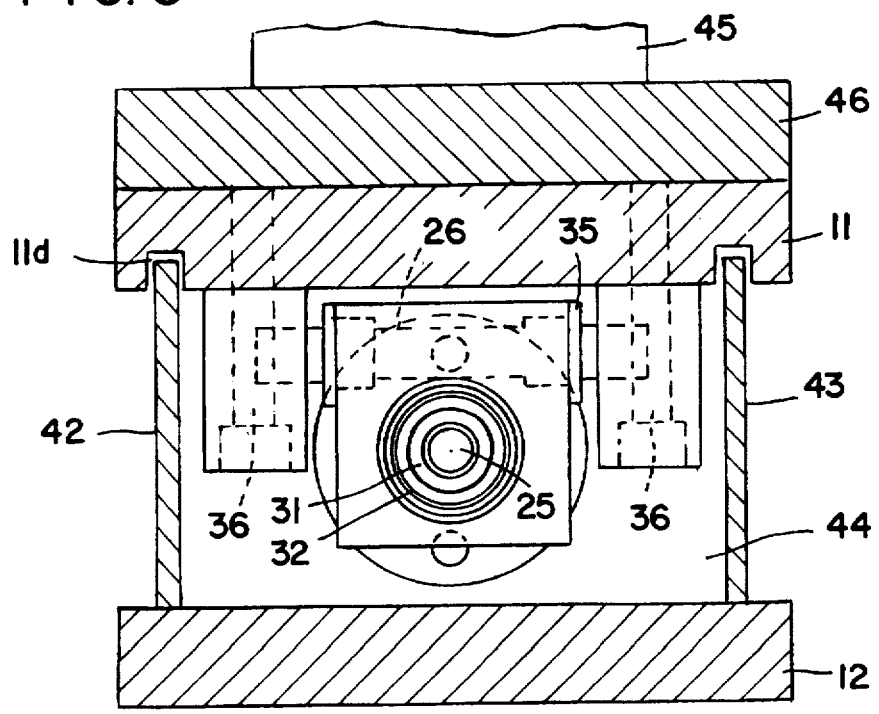
FIG. 3 is an end view, in cross section, of the load cell beam assembly of FIG. 1 taken along the axis designated 3—3 in FIG. 2.
Figure 4:
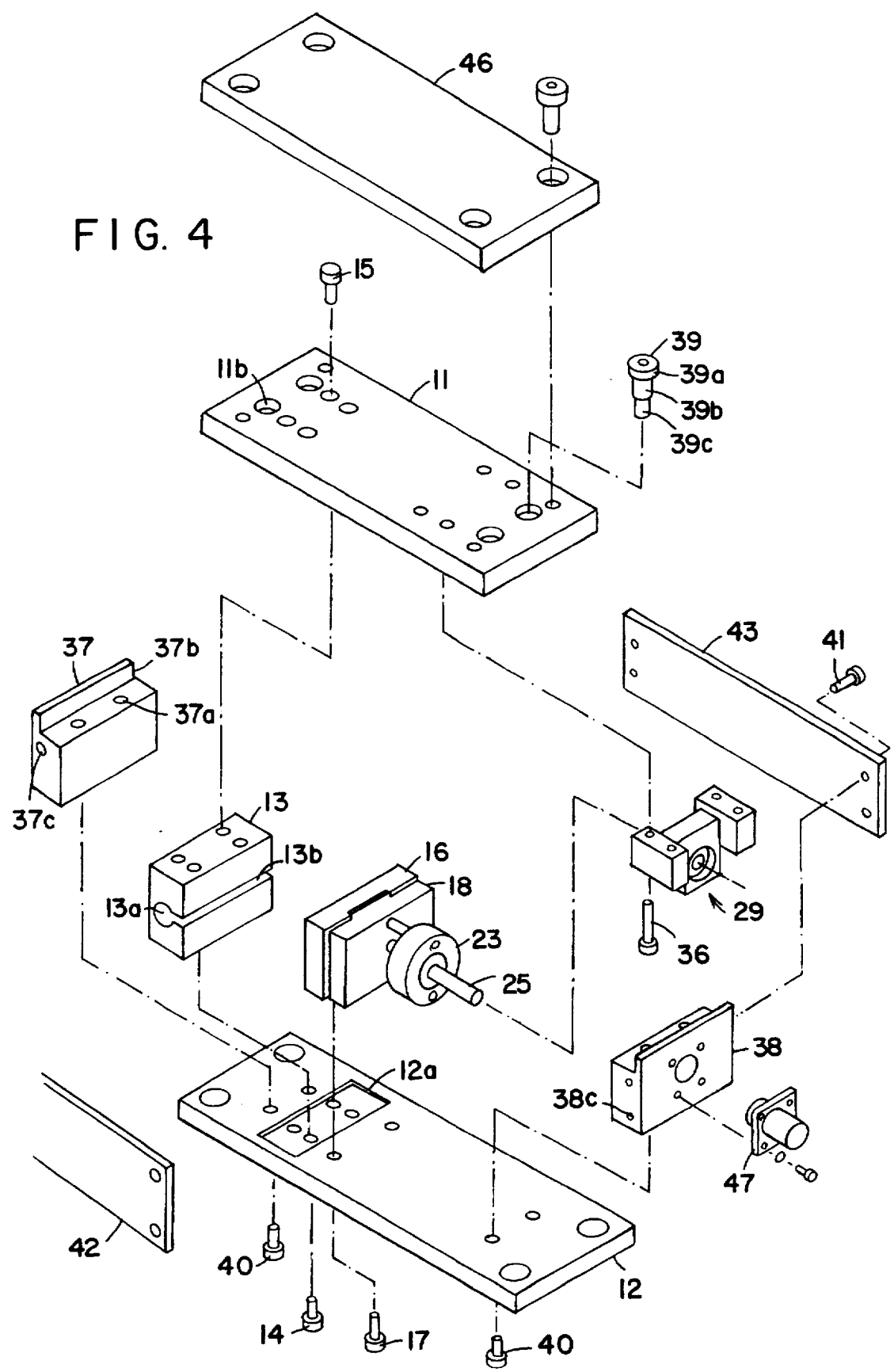
FIG. 4 is an exploded view, in perspective, of the load cell shown in FIG. 1.
Figure 6:
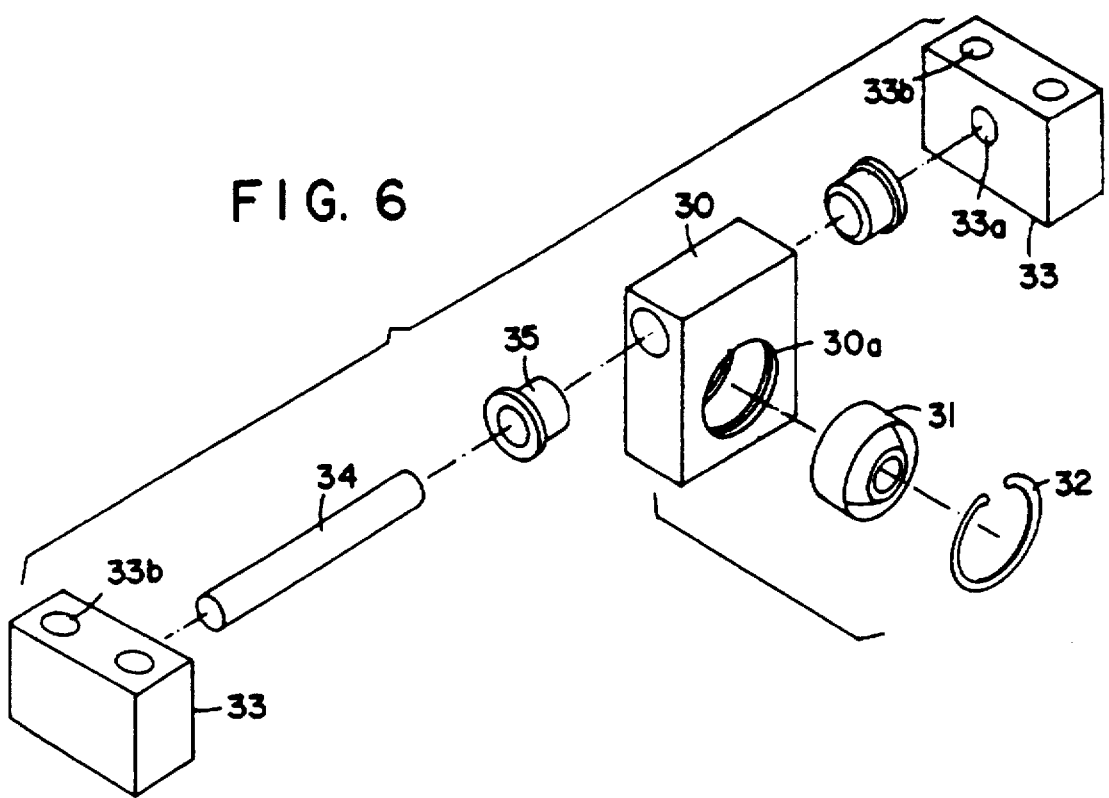
FIG. 6 is an exploded view, in perspective, of a link member of the load cell shown in FIGS. 2-4.

As shown in more detail in FIG. 6, link member 29 includes an adjustment support 30 having a central hole 30a therethrough for housing a second spherical bearing 31 and a second ring 32, through all of which the load transfer rod 25 extends. Link member 29 further includes a pair of support blocks 33 disposed on either side of said adjustment support 30 and a support rod 34, which secures the blocks 33 to the support 30 through a hole 30b in the adjustment support 30. A pair of flanged bearings 35 hold the rod 34 in place and the ends of the rod 34 form tight press fits in holes 33a in the support blocks 33. As shown in FIGS. 2–4, link member 29 (more precisely the support blocks 33) is secured to the top plate 11 by a plurality of screw fasteners 36 extending through a corresponding plurality of anchoring holes 33b in the support blocks 33 to the top plate 11. The other end of the load transfer rod 25, extending beyond the link member 29, is free.

A pair of end members 37 and 38 are disposed at either end of the load cell 10, i.e., adjacent said spring member 13 and said link member 29, respectively, as shown in FIGS. 2 and 4. The end members 37 and 38 are each secured to the top plate 11 by a plurality of shoulder bolts 39 extending through a corresponding plurality of holes 11b and smaller counterbores 11c therethrough in the top plate 11. As shown in FIGS. 2 and 4, each shoulder bolt 39 has a head portion 39a extending through the hole 11b, an intermediate portion 39b extending through the counterbore 11c in the top plate 11, and a threaded portion 39c which engages a respective one of a corresponding plurality of threaded holes 37a and 38a through the respective end members 37 and 38. The depth of threaded engagement and the size of the gap between the head portions 39a of the shoulder bolts 39 and the seat of the holes 11b is adjustable by loosening or tightening the shoulder bolts 39. Each end member 37 and 38 is also secured to the base plate 12 by a plurality of screw fasteners 40 extending through the base plate 12.

As also shown in FIG. 2, each of said end members 37 and 38 has a flanged portion 37b and 38b, respectively, which fits within a grooved portion 11d along an inner surface 11e of the top plate 11. The flanged portions 37b and 38b, however, preferably do not actually contact the top plate 11. As shown in FIG. 2, small gaps separate the flanged portions 37b and 38b from the sides of the grooved portion 11d. As discussed above, the depth of threaded engagement and the gap size between the head portions 39a of the shoulder bolts 39 and the seat of the holes 11b are adjustable to maintain separation. This configuration acts as a safety stop to prevent overload forces acting on the top plate 11 from reaching the less sturdy components of the load cell 10, such as the gauged beams 21. That is, an upper limit on the web load can be predetermined and the shoulder bolts 39 adjusted accordingly so that one or both of the flanged portions 37b and 38b contact the sides of the grooved portion 11d and divert loads in excess of said predetermined upper limit to the respective end members 37 and/or 38.

As further shown in FIG. 4, a plurality of screw fasteners 41 secure a pair of cover plates 42 and 43 to end members 37 and 38 through additional threaded holes 37c and 38c therein, forming an enclosed space 44, shown in FIGS. 2 and 3, which serves to protect the internal components from damage. The cover plates 42 and 43 also engage the top plate 11 along the grooved portion 11d extending therearound. As with the flanged portions 37b and 38b of the end members 37 and 38, gaps between the cover plates 42 and 43 and the top plate 11, as shown in FIG. 3, prevent contact between the components. As discussed, gap sizes can be changed by adjusting the shoulder bolts 39. This gap configuration around the entire grooved portion 11d of the top plate 11 serves as a "labyrinth" seal, which protects the internal components against spills, splashes and dust.

A bearing, shown in FIGS. 1 and 2 as a conventional pillow block bearing 45, is mounted on the pillow block plate 46, which in turn is secured to the top plate 11. The details of the bearing 45 are not illustrated, since they will be understood by those acquainted with the art, but it can be seen that the bearing 45 has a cylindrical bore 45a for receiving a load-bearing shaft (not shown). Load cells 10 may be disposed under the bearings 45 at either or both ends of the shaft.

All of the elements described in the foregoing discussion are suitably formed of metal, such as aluminum or steel. The gauged beams are preferably formed of aluminum or other such malleable metal that deflects enough to strain the strain gauges. The deformable spring member is made of steel, preferably 1045 CR steel, treated by the aforementioned shot peen process.

Figure 7:
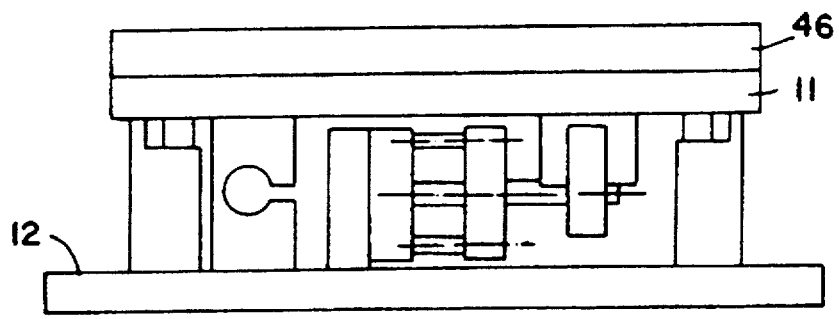
FIG. 7 is a representational side view of the load cell shown in the preceding FIGURES showing the load cell configuration with a normal load placed thereon.

A load cell beam assembly of the invention operates in the following manner. Loads upon a shaft from supporting a web material thereon, such as paper, foil and other materials, are transferred to bearings 45 disposed at both ends of the shaft. The load is then distributed to load cells 10 disposed under either or both of said bearings 45, particularly to the top plates 11 thereof. Spring member 13, which as seen in FIG. 2 is longer or taller than the other internal components of the load cell 10, i.e., the non-flanged portions of the end members 37 and 38, the guide supports 16 and 18 and the collar member 23, maintains the horizontal position of the top plate 11 under no load conditions and deflects in response to loads placed thereon. In other words, the strength of the spring member 13 is selected to withstand a predetermined amount of applied force, such as due to the tare weight of the bearing 45 and shaft, pillow block plate 46 and top plate 11, without deforming, keeping the top plate 11 substantially parallel to the bottom plate 12, as shown in FIG. 7.

Figure 8:
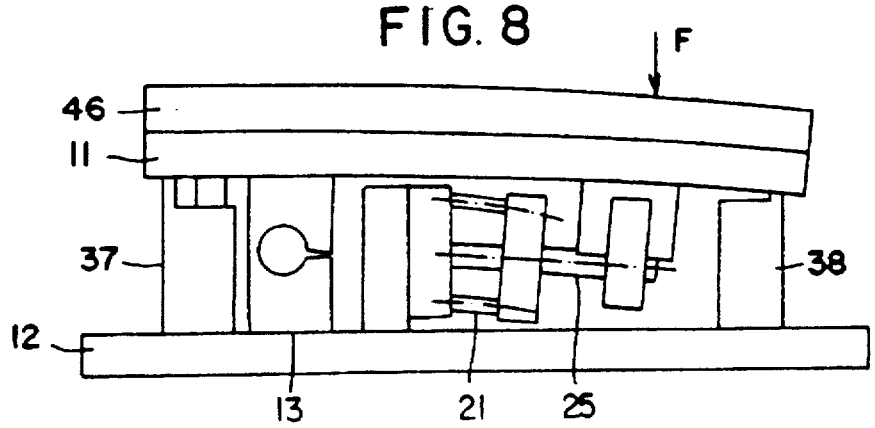
FIG. 8 is an exaggerated representational side view of the load cell of FIG. 7 with an orthogonally-directed excessive load placed thereon and showing the deformation and deflection of the various components therein.

When a load is placed on the load cell 10, however, the spring member 13 deforms, and starts to close the gap 13c distance, simultaneously deflecting or tilting the top plate 11 downwards, as shown in an exaggerated manner in FIG. 8.

Link member 29, attached to the tilting top plate 11, also tilts, causing the load transfer rod 25 supported therein to also deflect downwards. As the load transfer rod 25 deflects, the collar member 23 and gauged beams 21 secured thereto also deflect in a downward direction. Deflection of the gauged beams 21 is localized and facilitated by the thinning of the central portions 21a and by making the gauged beams 21 out of a softer and more bendable material, such as aluminum. The strain gauges x and y, positioned on those flat central portions 21a, sense the mechanical stress in the bending gauged beams 21 and convert the detected mechanical stress into an electrical voltage signal which is carried by electrical wires 48, shown in FIG. 1, from the strain gauges x and y through a passage 38d in said end member 38 and a connector 47 therein to a controller 49 or other conventional electronic circuitry for amplification and comparison of the signals from the gauged beams 21, for example, by use of electrical bridge circuitry such as a Wheatstone bridge. Loads above the predetermined upper limit are diverted to the end members 37 and 38, as heretofore described.

As also shown in FIGS. 2 and 8, the amount of deflection of the top plate 11 in response to an applied load F in excess of said predetermined upper limit is controlled and further rotation or deflection of the top plate 11 is prevented by its contact with the end members, particularly end member 38, along the sides of the grooved portion 11d. Therefore, the amount of deflection or bending of the load transfer rod 25 is controlled and the bending of the gauged beams 21, which follow the bending load transfer rod 25, is also controlled and destructive overbending of both rod 25 and beams 21 prevented. Also, since loads in excess of said predetermined upper limit are diverted to the end members 37 and 38 and kept off the spring member 13, the amount of deformation thereof is kept to a minimum and the risk of fracturing greatly reduced.

The measurements resulting from processing the signals representing strain on the gauged beams 21 are, up to a point, indicative of the forces acting on a shaft mounted in the bearing 45. That is, under no load conditions when no deformation of the deformable spring member 13 occurs, the strain gauges x and y do not trigger an output voltage. Loads up to said predetermined upper limit acting on the load cell 10, however, generate an output voltage proportional to that load. Thus, for loads up to this upper limit, signals are sent from the strain gauges x and y on the deflected gauged beams 21 to the controller 49, and adjustments can be made and corrective action taken if the measured forces on the shaft differ from a desired value. Forces beyond this upper limit, however, do not reach the gauged beams 21 or strain gauges x and y, and are distributed elsewhere to other components, such as the end members 37 and 38. Thus, the less robust components of the load cell 10 are isolated from destructive loads even though registering the presence of a load at the upper limit.

Axial and other undesirable loads placed on the load cell 10 are also diverted away from the more delicate components by the link member 29. As shown in FIG. 3, adjustment support 30 supports the load transfer rod 25 therein. The two support blocks 33, disposed on either side of the support 30, are spaced therefrom and interconnected thereto by the adjustment rod 34. Axial forces acting on the load cell are diverted through the adjustment rod 34, and adjustment support 30, sliding along the rod 34 by means of the flanged bearings 35, does not receive the axial forces. Thus, the load transfer rod 25 is not deflected by the axial load and the gauged beams 21 are isolated from such axial loads.

An advantage of the configuration of the load cell 10 of the present invention over the art is ease of access to the internal components. Since after installation at least one side of a load cell 10 is generally inaccessible, the internals of the load cell 10 can nonetheless be reached and adjusted by removing either of the cover plates 42 and 43. This configuration contrasts sharply with related prior art transducer devices that require disassembly of the entire device and disconnection from the bearing assembly to determine and correct any internal problem. In contrast, if a gauged beam 21 fails in the load cell 10 of the present invention, removal of either of the cover plates 42 or 43 readily exposes the components. With a small wrench the screw fasteners 19 conjoining the first 16 and second 18 guide supports are then loosened and the defective gauged beam 21 replaced. This configuration also simplifies the initialization and reinitialization of the output of the strain gauges x and y by subtracting the tare weight thereon, e.g., the pillow block plate 46, the pillow block bearing 45, and idler roll assembly (not shown) and the top plate 11 of the load cell 10.

It should be understood that the strain gauges used to detect and measure mechanical stress in the invention can include foil or other type strain gauges in addition to the currently preferred semiconductor type strain gauges, such as a Linear Variable Displacement Transducer (LVDT).

It should also be understood that the load cell 10 of the present invention may be adapted for applications other than the paper/foil type web operations heretofore described. For example, the load cell 10 of the invention may be used in fiber optical applications which require more sensitive and accurate measurements. One way to vary the sensitivity for different load measurements is to vary the diameter of the bore 13a through the deformable spring member 13. Increasing the bore size reduces the load rating and, conversely, decreasing the bore size increases the load rating for a particular load cell beam assembly configuration. Other means for sensitizing the operation of the load cell 10 of the invention, such as by modifying the material compositions of the gauged beams 21, spring member 13 or other component, or varying the number, type and placement of the strain gauges x and y, will be understood by those acquainted with the art.

It should further be understood that the load cell 10 of the present invention can be positioned in a number of orientations in addition to the downward load configuration exemplified in the FIGURES. For example, the load cell 10 can be oriented at an angle or upside down to measure vertically-directed loads. The shoulder bolts 39 of the invention provide overload protection for such an inverted mounting of the load cell 10.

It should also be understood that the size of the gaps separating the end members 37 and 38 and cover plates 42 and 43 from the sides of the grooved portion 11d of the top plate 11 can be adjusted to keep the top plate 11 from deflecting more than a desired amount, e.g., 1/16 inch. Thus, the amount of deflection of the top plate 11, cantilevered from the spring member 13, as well as the amount of deflection of the load transfer rod 25 and gauged beams 21, cantilevered from the second guide support 18, can be calculated to maximize sensitivity of the load cell beam assembly and prevent overdeflection.

Although certain preferred embodiments of the load cell 10 for use in such an assembly have been described in detail, various modifications and variations will suggest themselves to those acquainted with the art, such as, for example, the use of the load cell 10 with some other form of shaft mounting than the pillow block illustrated, or the use of the load cell 10 for measuring forces other than forces acting on a shaft.

What is claimed is:

1. A load cell for sensing mechanical force and producing a corresponding electrical voltage signal, comprising: parallel and elongated top and base plates and a deformable member secured to each of said plates adjacent one end thereof, said deformable member having deformation means extending along one side thereof facing the opposite ends of said plates, a support member adjacent said deformation means of said deformable member and affixed to said base plate, at least two gauged beams extending substantially parallel to the longitudinal axes of said top and base plates toward said opposite ends of said plates, said gauged beams being affixed at one end to said support member and at the other end to a collar member and having strain gauge means mounted thereon for sensing said mechanical force and producing said corresponding electrical voltage signal, and a load transfer rod affixed at one end to said support member and extending between and substantially parallel to said gauged beams through said collar member to a link member affixed to said top plate, whereby when said deformable member deforms along said deformation means, said top plate tilts towards said base plate and said load transfer rod and gauged beams deflect.

2. The load cell of claim 1, wherein said deformation means in said deformable member comprises a bore through said deformable member, said bore being substantially parallel to said top and base plates and substantially orthogonal to the longitudinal axes thereof, and a slot along said one side of said deformable member substantially parallel to said bore and connected thereto.

3. The load cell of claim 1, wherein said deformable spring member is made of steel and treated by a shot peen process for relieving inherent tension within the steel.

4. The load cell of claim 1, wherein said at least two gauged beams are substantially cylindrical and wherein said strain gauge means are mounted on a flat central portion in said gauged beams.

5. The load cell of claim 4, comprising two gauged beams, and wherein said flat central portions in said two gauged beams face one another.

6. The load cell of claim 1, wherein said at least two gauged beams are symmetrically disposed around said load transfer rod.

7. The load cell of claim 1, wherein said gauged beams are made of aluminum.

8. The load cell of claim 1, further comprising a spherical bearing in said collar member supporting said load transfer rod.

9. The load cell of claim 1, further comprising a spherical bearing in said link member supporting said load transfer rod.

10. The load cell of claim 1, further comprising a first and a second end member, said first end member being disposed adjacent said deformable member and opposite said deformation means, and said second end member being disposed at the opposite end of said top plate adjacent said link member, each of said end members having a flanged portion engaging a grooved portion of said top plate.

11. The load cell of claim 10, wherein said flanged portions of said end members are separated from said grooved portion of said top plate by a gap.

12. The load cell of claim 1, wherein said link member comprises an adjustment support having an opening therethrough for receiving said load transfer rod therein, a pair of support blocks disposed on opposite sides of said adjustment support transverse the longitudinal axis of said load transfer rod, each of said support blocks being affixed to said top plate, and an adjustment support rod extending through a hole in said adjustment support transverse said axis and affixed at each end to a respective one of said support blocks, said support blocks each being separated from said adjustment support by a gap amount.

13. The load cell of claim 12, further comprising a pair of bearings at both ends of said hole in said adjustment support for receiving said adjustment support rod therethrough, said support blocks each being separated from said adjustment support and said bearings by a second gap amount.

14. The load cell of claim 1, wherein said support member has at least two holes therethrough for receiving said one end of said at least two gauged beams therein, and said collar member has at least two holes therethrough for receiving said opposite end of said at least two gauged beams therein.

15. The load cell of claim 1, further comprising a controller means for receiving said electrical voltage signal from said strain gauge means, said signal being proportional to the mechanical force sensed by said strain gauge means.

16. A load cell assembly for measuring forces acting on a shaft, which includes means for mounting a shaft bearing, a load cell affixed to and beneath said mounting means and to and over a fixed structure, said load cell comprising: parallel and elongated top and base plates and a deformable member secured to each of said plates adjacent one end thereof, said deformable member having deformation means extending along one side thereof facing the opposite ends of said plates, a support member adjacent said deformation means of said deformable member and affixed to said base plate, at least two gauged beams extending substantially parallel to the longitudinal axes of said top and base plates toward said opposite ends of said plates, said gauged beams being affixed at one end to said support member and at the opposite end to a collar member and having strain gauge means mounted thereon for sensing said mechanical force and producing said corresponding electrical voltage signal, and a load transfer rod affixed at one end to said support member and extending between and substantially parallel to said gauged beams through said collar member to a link member affixed to said top plate, whereby when said deformable member deforms along said deformation means, said top plate tilts towards said base plate and said load transfer rod and gauged beams deflect.

17. The load cell of claim 16, wherein said deformation means in said deformable member comprises a bore through said deformable member, said bore being substantially parallel to said top and base plates and substantially orthogonal to the longitudinal axes thereof, and a slot along said one side of said deformable member substantially parallel to said bore and connected thereto.

18. The load cell of claim 16, wherein said at least two gauged beams are substantially cylindrical and wherein said strain gauge means are mounted on a flat central portion in said gauged beams.

19. The load cell of claim 18, comprising two gauged beams, and wherein said flat central portions in said two gauged beams face one another.

20. The load cell of claim 16, wherein said at least two gauged beams are symmetrically disposed around said load transfer rod.

21. The load cell of claim 16, further comprising a first and a second end member, said first end member being disposed adjacent said deformable member and opposite said deformation means, and said second end member being disposed at the opposite end of said top plate adjacent said link member, each of said end members having a flanged portion engaging a grooved portion of said top plate.

22. The load cell of claim 21, wherein said flanged portions of said end members are separated from said grooved portion of said top plate by a gap.

23. The load cell of claim 16, wherein said link member comprises an adjustment support having an opening therethrough for receiving said load transfer rod therein, a pair of support blocks disposed on opposite sides of said adjustment support transverse the longitudinal axis of said load transfer rod, each of said support blocks being affixed to said top plate, and an adjustment support rod extending through a hole in said adjustment support transverse said axis and affixed at each end to a respective one of said support blocks, said support blocks each being separated from said adjustment support by a gap amount.

24. The load cell of claim 23, further comprising a pair of bearings at both ends of said hole in said adjustment support for receiving said adjustment support rod therethrough, said support blocks each being separated from said adjustment support and said bearings by a second gap amount.

25. The load cell of claim 16, further comprising a controller means for receiving said electrical voltage signal from said strain gauge means, said signal being proportional to the mechanical force sensed by said strain gauge means.

* * * * *

UNITED STATES PATENT AND TRADEMARK OFFICE
CERTIFICATE OF CORRECTION

PATENT NO. : 5,777,240
DATED : July 7, 1998
INVENTOR(S) : GARETT E. LEFEBVRE ET AL.

It is certified that error appears in the above-indentified patent and that said Letters Patent is hereby corrected as shown below:

On the title page item

"[73] Assignee:" correct "Mass." to read --Me.--

Signed and Sealed this

Thirteenth Day of October 1998

*Attest:*

BRUCE LEHMAN

*Attesting Officer*      *Commissioner of Patents and Trademarks*